(12) United States Patent
Shukla

(10) Patent No.: US 8,811,206 B2
(45) Date of Patent: Aug. 19, 2014

(54) ACCESS POINT CONTROLLER FOR ADJUSTING A WIRELESS ACCESS POINT

(75) Inventor: Ashish Kumar Shukla, Yerwada (IN)

(73) Assignee: Marvell World Trade Ltd. (BB)

( * ) Notice: Subject to any disclaimer, the term of this patent is extended or adjusted under 35 U.S.C. 154(b) by 229 days.

(21) Appl. No.: 13/218,737

(22) Filed: Aug. 26, 2011

(65) Prior Publication Data
US 2012/0063337 A1  Mar. 15, 2012

Related U.S. Application Data

(60) Provisional application No. 61/382,415, filed on Sep. 13, 2010.

(51) Int. Cl.
*H04W 24/00* (2009.01)
(52) U.S. Cl.
USPC ............ 370/252; 370/310; 370/311; 370/241
(58) Field of Classification Search
None
See application file for complete search history.

(56) References Cited

U.S. PATENT DOCUMENTS

| | | | |
|---|---|---|---|
| 6,266,537 B1 * | 7/2001 | Kashitani et al. | 455/522 |
| 6,636,737 B1 * | 10/2003 | Hills et al. | 455/450 |
| 6,898,437 B1 | 5/2005 | Larsen et al. | |
| 6,956,527 B2 | 10/2005 | Rogers et al. | |
| 7,215,973 B2 | 5/2007 | Backes et al. | |
| 7,415,262 B2 | 8/2008 | Liu et al. | |
| 7,808,958 B1 | 10/2010 | Hernacki et al. | |
| 2001/0043660 A1 * | 11/2001 | Blakeney et al. | 375/377 |
| 2002/0142773 A1 * | 10/2002 | Rudrapatna et al. | 455/440 |
| 2002/0193133 A1 * | 12/2002 | Shibutani | 455/522 |
| 2003/0022686 A1 * | 1/2003 | Soomro et al. | 455/522 |
| 2004/0005907 A1 | 1/2004 | Tain et al. | |
| 2004/0132458 A1 * | 7/2004 | Bing et al. | 455/452.2 |
| 2005/0128970 A1 * | 6/2005 | Tsien et al. | 370/315 |
| 2008/0039038 A1 | 2/2008 | Hoekstra et al. | |

FOREIGN PATENT DOCUMENTS

| | | | |
|---|---|---|---|
| EP | 1 689 094 A2 | 8/2006 | |
| EP | 1 868 327 A2 | 12/2007 | |

OTHER PUBLICATIONS

Patent Cooperaton Treaty (PCT) International Search Report and Written Opinion from co-pending PCT International Application No. PCT/IB2011/002614 (International Filing Date Aug. 26, 2011) having a date of mailing of Feb. 21, 2012 (13 pgs).
Glatz, Eduard, "Wireless Mesh Networks: Introduction Basic Concepts", ATCN: WMN-BasicsWS0607.fm Mar. 9, 2007 (12 pgs).

* cited by examiner

*Primary Examiner* — Marcus R Smith
*Assistant Examiner* — Gautam Sharma

(57) ABSTRACT

Systems, methods, and other embodiments associated with controlling a wireless access point are described. According to one embodiment, an access point controller is configured to control a wireless access point. In one embodiment, the access point controller includes a detection logic configured to determine whether a wireless station that is wirelessly communicating with the wireless access point is within a predetermined distance to the wireless access point. In one embodiment, the wireless access point is configured to transmit signals at a first transmission rate within a first transmission range. The access point controller also includes an adjusting logic configured to, in response to the wireless station being within the predetermined distance to the wireless access point, reduce the first transmission range of the wireless access point to a second transmission range by increasing the first transmission rate of the wireless access point to a second transmission rate.

20 Claims, 4 Drawing Sheets

ACCESS POINT CONTROLLER FOR ADJUSTING A WIRELESS ACCESS POINT

CROSS REFERENCE TO RELATED APPLICATION

The present disclosure claims the benefit of U.S. Provisional Application Ser. No. 61/382,415 filed on Sep. 13, 2010, which is incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Devices that communicate wirelessly continue to become more prolific. Interference, security risks, and other undesirable effects can result from high concentrations of wireless devices in the same airspace. These issues are exacerbated by conventional wireless access points that add to the interference by transmitting signals within large footprints to provide maximum coverage. The large footprints typically overlap with neighboring access points, thus polluting the already limited airspace with more and more communications. Additionally, to provide maximum coverage conventional wireless access points typically also maintain slower data transmission rates that are compatible with longer transmission ranges. These slower transmission rates and long transmission ranges negatively impact performance of wireless networks by increasing interference, slowing communications, causing security risks, and using more power.

SUMMARY

According to one embodiment, an access point controller configured to control a wireless access point. In one embodiment, the access point controller includes a detection logic configured to determine whether a wireless station that is wirelessly communicating with the wireless access point is within a predetermined distance to the wireless access point. In one embodiment, the wireless access point is configured to transmit signals at a first transmission rate within a first transmission range. The access point controller also includes an adjusting logic configured to, in response to the wireless station being within the predetermined distance to the wireless access point, reduce the first transmission range of the wireless access point to a second transmission range by increasing the first transmission rate of the wireless access point to a second transmission rate.

In another embodiment, a method includes determining whether a wireless station that is wirelessly communicating with the wireless access point is within a predetermined distance to the wireless access point, wherein the wireless access point is configured to transmit signals at a first transmission rate within a first transmission range. The method also includes in response to the wireless station being within the predetermined distance to the wireless access point, reducing the first transmission range of the wireless access point to a second transmission range by increasing the first transmission rate of the wireless access point to a second transmission rate.

In another embodiment, a non-transitory computer-readable medium storing computer executable instructions that when executed by a processor cause the processor to perform a method that includes determining whether a wireless station that is wirelessly communicating with the wireless access point is within a predetermined distance to the wireless access point, wherein the wireless access point is configured to transmit signals at a first transmission rate within a first transmission range. The method also includes in response to the wireless station being within the predetermined distance to the wireless access point, reducing the first transmission range of the wireless access point to a second transmission range by increasing the first transmission rate of the wireless access point to a second transmission rate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some examples, one element may be designed as multiple elements or that multiple elements may be designed as one element. In other embodiments, an element shown as an internal component of another element may be implemented as an external component and vice versa. Furthermore, elements may not be drawn to scale.

DETAILED DESCRIPTION

Described herein are example methods, devices, and other embodiments associated with improving wireless communications. In some embodiments, the present disclosure is described with reference to handheld devices that communicate wirelessly and serve as wireless access points for other devices. Such handheld devices are referred to as micro access points (µAP). Micro access points can wirelessly share network access with many wireless devices. Even though micro access points are implemented with handheld devices, micro access points retain characteristics of a device that is a dedicated wireless access point. For example, micro access points are configured to wirelessly communicate at ranges comparable to dedicated wireless access points.

Figure 1:
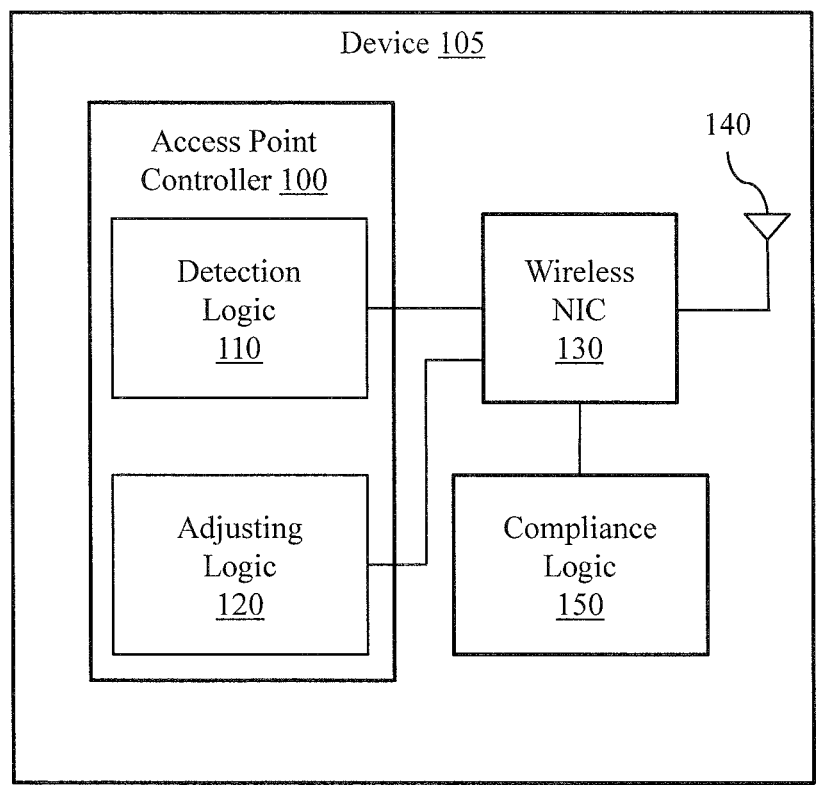
FIG. 1 illustrates one embodiment of an access point controller for controlling wireless communications in a device.

With reference to FIG. 1, one embodiment of an access point controller 100 is shown that is implemented in a device 105 and is configured to control wireless communications. Access point controller 100 includes detection logic 110 and adjusting logic 120, which are described in more detail below. In one embodiment, the device 105 is a handheld device that includes a wireless Network Interface Card (NIC) 130 and a compliance logic 150 for communicating wirelessly. The wireless NIC 130 is connected to wireless antenna 140. Wireless antenna 140 is, for example, an external antenna or an internal antenna that is implemented on a chip. In one embodiment, the access point controller 100 is implemented on a chip including one or more integrated circuits configured to perform one or more of the functions described herein.

Figure 2:
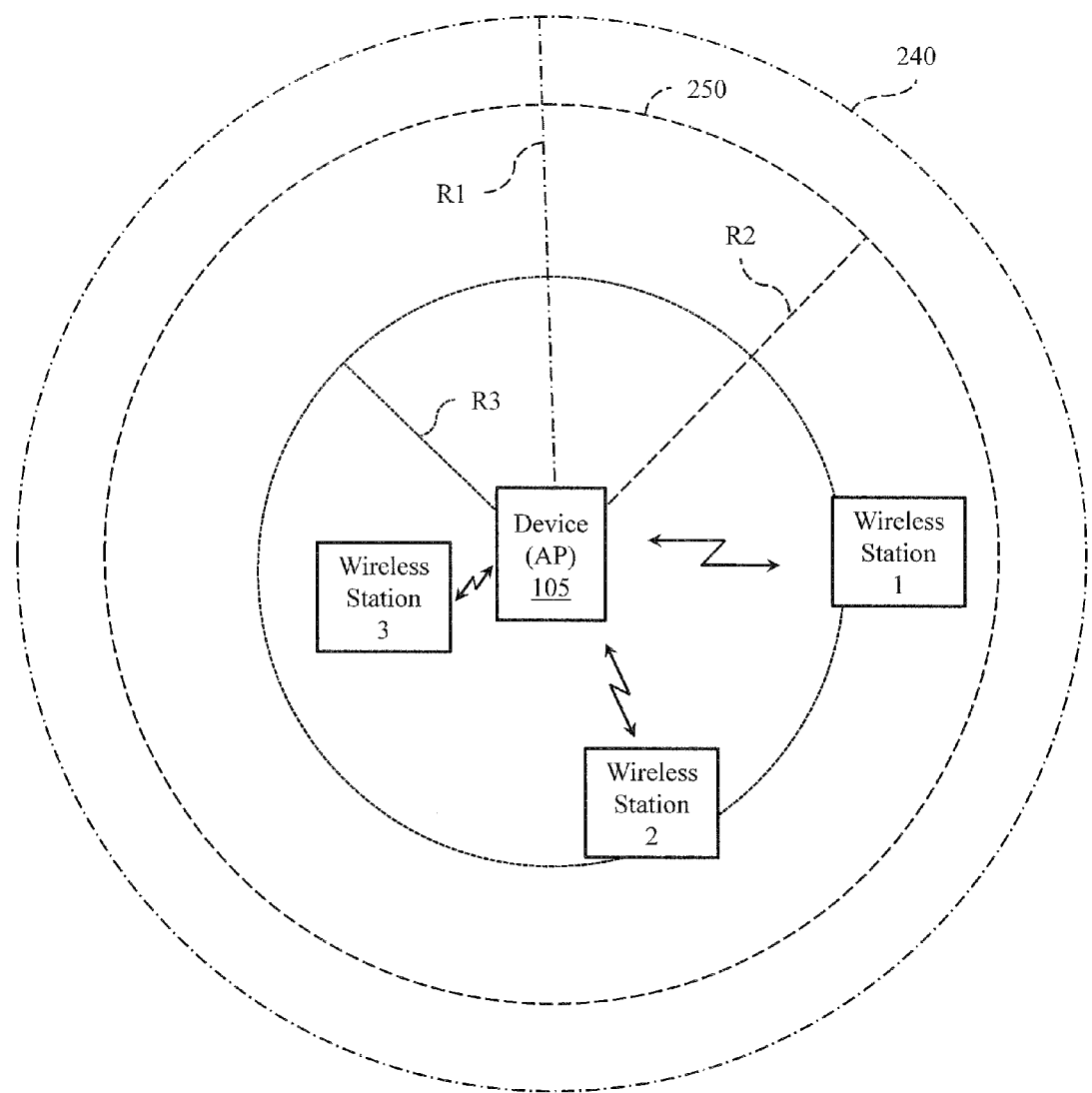
FIG. 2 illustrates one embodiment of the device of FIG. 1 communicating with wireless stations at different transmission ranges.

In one embodiment, device 105 is configured to operate as a wireless access point (AP). Assume the device 105 operates with a transmission range within which wireless signals are communicated. For example, with reference to FIG. 2, the device 105 is shown as a wireless access point and the transmission range is illustrated with a radius represented by the dashed line labeled R1. Thus the device 105 has a coverage area represented by the area enclosed by the dashed circle 240. The transmission range R1 is, for example, a maximum transmission range that provides maximum wireless coverage for the access point. However in certain situations, micro access points such as device 105, provide access to devices that are physically positioned closer to the device 105 often within a smaller coverage area (e.g., positioned at a distance less than maximum range R1). For example, FIG. 2 illustrates three wireless stations 1, 2, and 3 that are positioned within the range R1. Therefore, the device 105 can be considered to be using more power than what is needed since the device 105 does not always need to transmit at the maximum transmission range R1 to provide sufficient wireless coverage.

In one embodiment, the device 105 can improve wireless communications by reducing the transmission range to a distance that includes only the devices in communication with the access point. For example as illustrated in FIG. 2, the transmission range R1 of the device 105 exceeds the distance of the furthest wireless station (wireless station 1) from device 105. The device 105 is configured to detect this situation and adjust/reduce the transmission range to transmission range R2. In this way, the device 105 transmits to a range R2 that only includes the devices/stations that are communicating with the device 105 (e.g., wireless station 1, wireless station 2, and wireless station 3). The reduced transmission range R2 facilitates reductions in interference from foreign devices that may be present beyond the transmission range R2.

In one embodiment, the device 105 increases its wireless transmission rate in order to reduce the transmission range. The net effect is that communication to other devices nearby are rendered ineffective because of the signal-to-noise ratio SNR changes (e.g., a higher SNR is required at higher transmission rates). Thus, nearby devices will not detect a packet transmitted at a higher rate and therefore will not perform any processing related to packets. The rate change effectively changes the transmission range because the signals are not recognized by some devices. By reducing the transmission range as shown in FIG. 2, the device 105 may save battery power, improve communication rates, avoid interference with other devices, and/or also may improve security by having fewer devices being able to intercept the transmissions. In another embodiment, the device 105 also reduces its transmission power in addition to increasing the transmission rate to reduce the transmission range.

In one embodiment, the device 105 is implemented in a smartphone, a mobile device, a camera, a handheld device, and so on. In other embodiments, the device 105 is a standalone/dedicated wireless access point. In one embodiment, the wireless access point is configured to access a network such as the Internet through a cellular telephone connection, an Ethernet connection, or other network protocol. Wireless stations 1, 2, and 3 are, for example, wireless NICs that are implemented within a device. A device that includes a wireless station may be a handheld device, a computer, a laptop, an mp3 player, a camera, a smartphone, a gaming device, a PDA, and so on.

With reference again to FIG. 1, to implement the functions described above, the access point controller 100 is configured to control and adjust transmission settings of the device 105 based at least in part on the distances of the stations that are in communication with the device 105. In one embodiment, the access point controller 100 is configured to adjust the device 105 to transmit signals at a range selected from a group of predetermined/preset ranges. For example, the predetermined ranges may include 100 meters (e.g. range R1), 70 meters (e.g., R2), 10 meters (e.g., range R3), and/or other preset ranges. Various transmission rates and/or power settings used to implement each transmission range may be stored in a memory and used to adjust the device 105. The transmission rates and power settings associated with certain ranges can be determined, for example, through experiments and tests. Thus, based on the distances of the stations in communication with the device 105, a smaller yet sufficient transmission range is selected to ensure that the stations are within the selected range.

For example, the detection logic 110 of the access point controller 100 is configured to determine the distances of the wireless stations (e.g., wireless stations 1, 2, and 3 shown in FIG. 2). Once the furthest distance is identified (e.g., wireless station 1 of FIG. 2), the detection logic 110 determines whether the furthest wireless station is within any of the predetermined distances of the preset ranges. In this example, the furthest station is within the preset transmission range R2 that is less than the maximum range R1. Thus, device 105 may operate at transmission range R2 and still provide sufficient coverage to its group of wireless stations. The detection logic 110 then informs the adjusting logic 120 to adjust the wireless NIC 130 to operate at the predetermined range R2.

When the device 105 is communicating with multiple wireless stations, as illustrated in FIG. 2, the device 105 determines distances for the multiple stations and compares those distances with the predetermined distances to determine which predetermined/preset range encompasses all of the wireless stations. In this way, the wireless stations do not lose communications with the device 105 when the transmission range is reduced from range R1 to range R2 or other range.

In another embodiment, the detection logic 110 is configured to dynamically adjust the transmission range based on the furthest wireless station without using preset ranges. For example, after the furthest wireless station that is communicating with the device 105 is determined, the distance is provided to the adjusting logic 120. The adjusting logic 120 then adjusts the device 105 to transmit at a reduced range that at least includes the further wireless station (e.g., reduce from range R1 to range R2 that is beyond the furthest station). In this way, the device 105 does not lose communication with any wireless stations when reducing the transmission range.

In one embodiment, to determine the distance of a wireless station from the device 105, the detection logic 110 is configured to use the signal strength of packets received from the wireless station. By determining the signal strength of the packets, the detection logic 110 can estimate the distance to the wireless station. In one example, the detection logic 110 estimates the distance using parameters associated with the Received Signal Strength Indication (RSSI) protocol for the packet from the associated wireless station. In general, the stronger the signal strength, the closer the station is.

In another embodiment, the detection logic 110 may determine the distance to the wireless stations by sending probe requests using different transmission ranges. When using probe requests, the detection logic 110 varies the transmission range for multiple probe requests and can determine the distance of a wireless station by correlating a transmission range to a response received from the wireless station by the wireless NIC 130 for a particular probe request. For example, the detection logic 110 starts by sending a probe request with a transmission range that is 10 meters. In response to the 10 meter probe request, only devices within the 10 meter range will receive the probe and send a reply. The detection logic may then send a probe request with a transmission range of 15 meters, and so on until the maximum range is reached. Thus, by gradually increasing the transmission range of probe requests, distances for different wireless stations can be determined.

In other embodiments, the distance of a wireless station may be determined by using an indicator that is provided in a communication to the device 105 from the wireless station. The indicator is, for example, a verification by a user of the wireless station that the wireless station is within a predetermined transmission range of the device 105.

In one embodiment, the detection logic 110 is also configured to dynamically determine a distance of a wireless station from the device 105. The detection logic 110 many continuously or intermittently check the distances of the wireless stations from the device 105 and compare the distances to the current transmission range. The wireless stations may be mobile and may move between locations. If the movement causes the wireless stations to get physically closer to the device 105, then the transmission range may be further reduced. However, if one or more stations move towards the current transmission range, the range may be increased so that communication is not lost. In this way, the detection logic 110 monitors the distance of the wireless stations so that the adjusting logic 120 can adjust the transmission range of the device 105 to an appropriate range. Dynamically determining the distance facilitates the adjusting logic 120 determining when to adjust the transmission range and the transmission rate.

To achieve the improvements in wireless communications as seen in FIG. 2, the adjusting logic 120 is, for example, configured to adjust attributes of the device 105 to change how the device 105 wirelessly communicates. In one example, the adjusting logic 120 is configured to: i) reduce the transmission range (e.g. R1) of the device 105 to a second transmission range (e.g. R2) and, ii) increase a transmission rate of the device 105. The adjusting logic 120 reduces the transmission range and increases the transmission rate when the detection logic 110 has determined the wireless stations are within the predetermined distance (e.g., range R2) of the device 105. With reference to FIG. 2, when wireless station 1 moves within the predetermined distance, illustrated by R2 and area 250 in FIG. 2, the adjusting logic 120 reduces the transmission range R1 to a radius of R2. Also, since the wireless stations are physically closer, the adjusting logic 120 increases the transmission rate to provide improved service to the wireless stations.

To further illustrate an example of the potential difference in how the device 105 may communicate upon adjusting the transmission range, consider an example where R1 is 100 meters and R2 is 10 meters. In this example, reducing the transmission range by 90 meters improves the quality of wireless communications since i) many devices that would otherwise interfere are no longer within range, ii) the power used to transmit is reduced, and iii) transmission rates can be increased. Thus, reducing the transmission range can provide operational benefits to the device 105 such as improving battery life and functioning more efficiently.

In one embodiment, to reduce the transmission range, the adjusting logic 120 is configured to reduce the current transmission range of the device 105 by increasing the transmission rate of the signals. In another embodiment, the adjusting logic 120 is configured to reduce a transmission power of the device 105 as well as increase the transmission rate. In one example, the adjusting logic 120 is configured to reduce power to a transmitter in the wireless NIC 130. Additionally, the adjusting logic 120 is configured to increase the transmission rate of the device 105 before or after reducing the transmission power.

In one embodiment, the adjusting logic 120 increases the transmission rate based on a version of the 802.11 protocol supported by wireless stations communicating with the device 105. For example, when the wireless stations support the IEEE 802.11g protocol, the adjusting logic 120 may increase the transmission rate from a first rate supported by the protocol such as 36 Mbits/second to a second rate supported by the protocol such as 54 Mbits/second. In this way, the wireless NIC 130 of the device 105 can transmit at faster rates unhindered from maintaining longer transmission ranges.

In other examples, the adjusting logic 120 may increase the transmission rate by a larger margin, such as from 11 Mbits/second to 54 Mbits/second. The increase in transmission rate depends on transmission rates supported by the wireless stations in communication with the device 105. If a wireless station does not support the transmission rate in use by the device 105, then the wireless station may cause interference with the device 105 because it is not capable of deciphering the higher rate transmissions that control when the wireless station is permitted to transmit.

In another embodiment, the adjusting logic 120 is further configured to reduce the transmission range and increase the transmission rate based, at least in part, on a wireless profile. The wireless profile is, for example, a policy that indicates one or more predetermined distances for reducing the transmission range when all wireless stations are within those predetermined distances. The wireless profile may also indicate to dynamically adjust the transmission range based on a distance of an outermost wireless station without specifying specific predetermined ranges. In another embodiment, the wireless profile indicates data transmission rates that are compatible with the wireless stations.

With continued reference to FIG. 1, in one embodiment the device 105 includes compliance logic 150. The compliance logic 150 is, for example, configured to monitor for a foreign station within the current transmission range (e.g. R2). A foreign station is a wireless device that is within the range of the wireless access point but is not one of the devices that use the wireless access point for accessing a network. When a foreign station is detected within the current transmission range, the compliance logic 150 is configured to adjust the transmission rate of the device 105 based at least in part on the transmission rate of the foreign station. If the device 105 is transmitting at higher transmission rates than the foreign station can interpret, the foreign station may unknowingly attempt to transmit signals at the same time as the device 105. Accordingly, transmissions from the foreign station may interfere with transmissions from the device 105. Thus, in one embodiment, the compliance logic 150 is configured to adjust the transmission rate to a transmission rate that the foreign station is capable of interpreting. Therefore, device 105 avoids interference from foreign stations by monitoring for the foreign stations and adapting the transmission rate so that the foreign stations can interpret transmissions from the device 105. Such an adjustment may help to reduce interference caused by transmission collisions.

Figure 3:
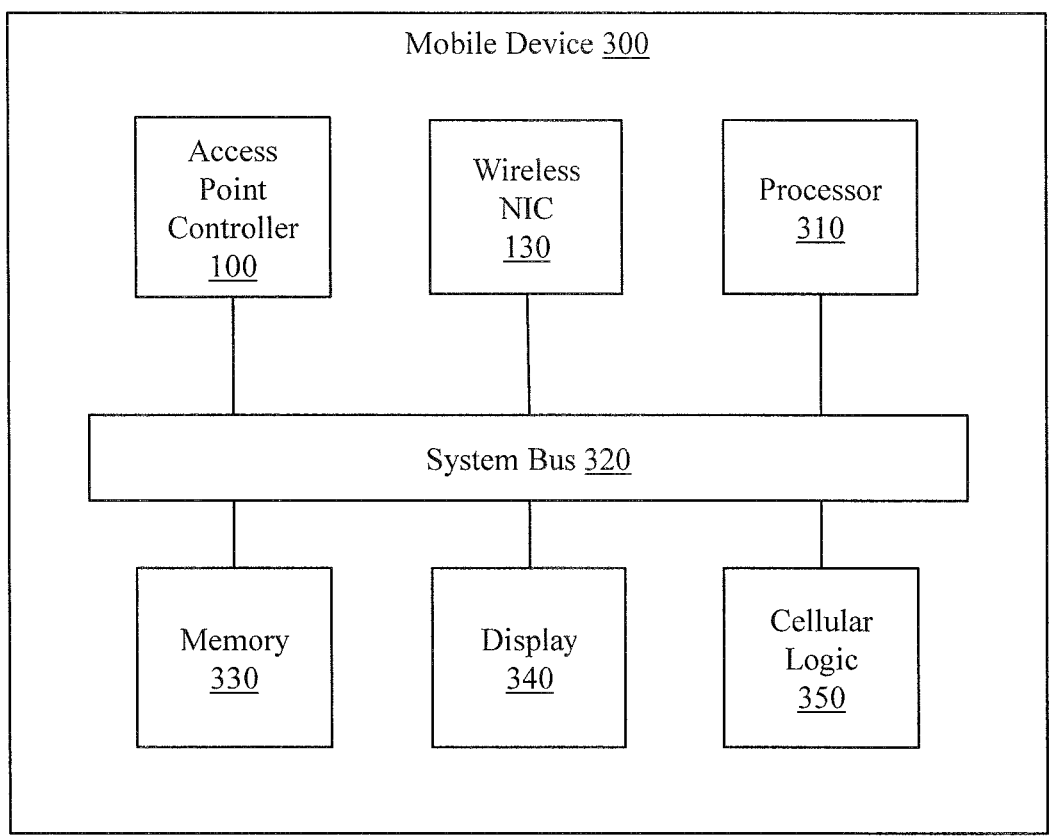
FIG. 3 illustrates one embodiment of a mobile device that includes an access point controller associated with improving wireless communications.

Continuing now to FIG. 3, FIG. 3 illustrates one embodiment of the access point controller 100 of FIG. 1 embedded in a mobile device 300. In this embodiment, access point controller 100 is implemented in, for example, a non-transitory computer readable medium that stores instructions, which when executed by a processor, control the mobile device 300 to perform the functions described. Mobile device 300 may include components such as the wireless NIC 130 of FIG. 1, a processor 310, a system bus 320, a memory 330, a display 340, and a cellular logic 350. The mobile device 300 is, for example, a Personal Digital Assistant (PDA), a laptop, a smartphone, a printer, and so on. In one embodiment, the mobile device 300 provides network access to a set of wireless stations. Thus, mobile device 300 is configured to function as a wireless access point as discussed previously.

Figure 4:
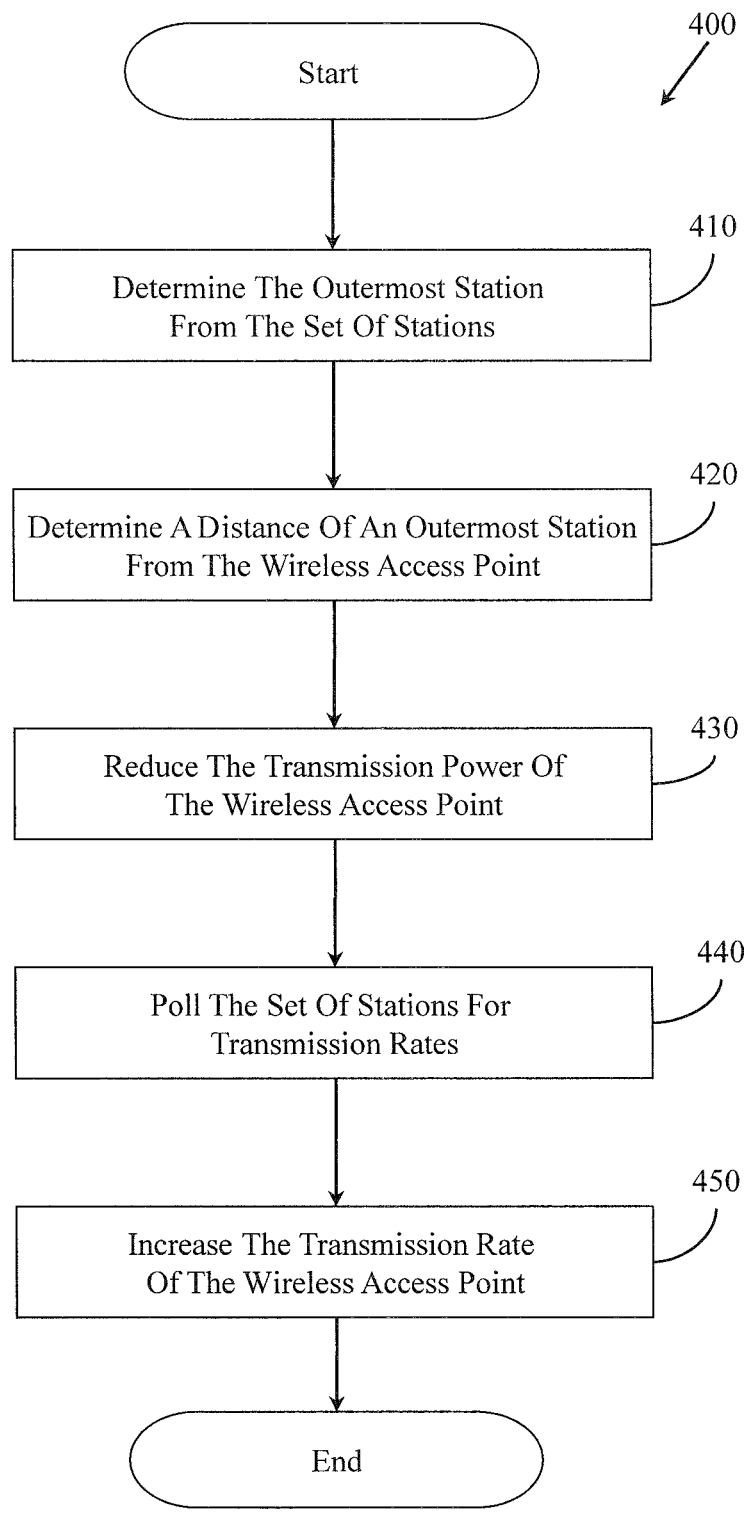
FIG. 4 illustrates one embodiment of a method associated with an access point controller for dynamically adapting a wireless access point.

With reference to FIG. 4, one embodiment of a method 400 is illustrated that may be performed by, for example, the device 105 of FIGS. 1 and 2 or the mobile device 300 of FIG. 3. In this example, method 400 will be discussed with reference to the mobile device 300 that is providing wireless network access for a set of nearby wireless stations. The mobile device 300 provides access to the Internet or other network using cellular logic 350 or other network protocol. Therefore, as discussed previously, the mobile device 300 functions as an access point and is configured to adjust its transmission range and rate based on the distances of the wireless stations.

At 410, the method 400 determines an outermost station from the set of wireless stations that are communicating with the mobile device 300. The outermost station is a station that is physically furthest from the mobile device 300. The method 400 may determine which station is the outermost station by, for example, determining which station has the weakest signal strength among the other wireless stations.

At 420, the method 400 determines the distance of the outermost station from the mobile device 300. In one example, the distance of the outermost station is determined from a user input. The user input is, for example, a message to the mobile device 300 ensuring that the outermost station is within a distance defined in a wireless access profile. In other examples, the distance of the outermost station is estimated based on the signal strength received from the station.

At 430, in response to determining the distance to the outermost station and determining that the distance is less than the current transmission range of the mobile device 300, the transmission power of the mobile device 300 is reduced. Reducing the transmission power causes a reduction in the transmission range. In this way, the mobile device 300 will reduce or eliminate interference with other wireless devices that are communicating outside of the outermost station. In one embodiment, the method 400 includes dynamically reducing the transmission power as the distance for the outermost station decreases. In alternative embodiments, the method 400 reduces the transmission power when the outermost station is within a predetermined range.

At 440, the method 400 polls the stations for their transmission rates. This may include sending a probe request requesting each station to identify their maximum transmission rate supported by that station. The method 400 then determines the optimal transmission rate from the probe responses by selecting the highest transmission rate that can be handled by all the stations (e.g., highest rate in common with all stations). In this way, the method 400 ensures that the stations all support the selected transmission rate. In one example, a probe response includes protocols supported by a station, such as IEEE 802.11a, 802.11b, 802.11g, 802.11n, and so on.

At 450, the method 400 increases the transmission rate of the mobile device 300, for example, based on the determined distance and the optimal transmission rate. In other embodiments, the method 400 may increase the transmission rate based on only the optimal rate.

In another embodiment, method 400 reduces the transmission range by increasing the transmission rate of communications without reducing the transmission power at 430. For example, increasing the transmission rate from a first rate to a greater/faster second rate will result in a smaller transmission range. Therefore, the transmission range may be reduced by increasing the transmission rate and/or decreasing the transmission power.

With the present systems and methods, the access point controller 100 reduces the transmission power and/or increases the transmission rates when appropriate. These adjustments in wireless communications facilitates avoiding interference with foreign wireless stations, increases battery life of the wireless access point, and may improve response times. The access point controller may further increase the battery life by increasing the transmission rate in conjunction with reducing the transmission power. Since increasing the transmission rate decreases the amount of time that the wireless access point is transmitting, power may also be conserved in this way.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An access point controller configured to control a wireless access point, the access point controller comprising:
    detection logic configured to determine whether a wireless station that is wirelessly communicating with the wireless access point is within a predetermined distance to the wireless access point, wherein the wireless access point is configured to transmit signals at a first transmission rate within a first transmission range, wherein the detection logic is configured to determine a distance from the access point to each of a plurality of wireless stations that include the wireless station communicating with the access point, and wherein the wireless station is a furthest wireless station of the plurality of wireless stations from the access point, wherein the detection logic is configured to poll the plurality of wireless stations to determine transmission rates for each of the plurality of wireless stations; and
    adjusting logic configured to, in response to the wireless station being within the predetermined distance to the wireless access point, reduce the first transmission range of the wireless access point to a second transmission range by increasing the first transmission rate of the wireless access point to a second transmission rate, wherein the adjusting logic is configured to change a transmission rate of the access point to change an effective transmission range of the access point according to a distance of the furthest wireless station that is communicating with the access point, and
    wherein the adjusting logic is configured to change the transmission rate includes changing the transmission rate to an optimal transmission rate for communicating with the plurality of wireless stations based, at least in part, on the poll of transmission rates.

2. The access point controller of claim 1, wherein the adjusting logic is further configured to reduce the first transmission range by reducing a transmission power of the wireless access point.

3. The access point controller of claim 1, wherein the detection logic is configured to determine whether the wireless station is within the predetermined distance by determining i) a signal strength of the wireless station based on a packet received from the wireless station.

4. The access point controller of claim 1, further comprising:
    compliance logic configured to monitor for a foreign station within the second transmission range, and to adjust the second transmission rate of the wireless access point when the foreign station is detected within the second transmission range based, at least in part, on a transmission rate of the foreign station, wherein the foreign station is a wireless station that is not a member of a set of wireless stations that have access to a network through the wireless access point.

5. The access point controller of claim 1, wherein the detection logic is further configured to dynamically determine a distance of the wireless station from the wireless access point as the distance of the wireless station from the wireless access point changes.

6. The access point controller of claim 1, wherein the adjusting logic is further configured to reduce the first transmission range and increase the first transmission rate based, at least in part, on a wireless profile.

7. The access point controller of claim 1, wherein the access point controller is implemented in the wireless access point, and wherein the wireless access point is implemented in a smartphone, a mobile device, a wireless network access point, a camera, or a handheld device.

8. A method of operating a wireless access point, wherein the wireless access point transmits signals at a first transmission rate within a first transmission range, the method comprising:
    determining whether a wireless station that is wirelessly communicating with the wireless access point is within a predetermined distance to the wireless access point, wherein determining whether the wireless station is within the predetermined distance includes determining a distance from the access point to each of a plurality of wireless stations that include the wireless station communicating with the access point, and wherein the wireless station is a furthest wireless station of the plurality of wireless stations from the access point;
    determining an optimal transmission rate for the wireless station by polling a set of wireless stations that are communicating with the wireless access point for transmission rates; and
    in response to the wireless station being within the predetermined distance to the wireless access point, reducing the first transmission range of the wireless access point to a second transmission range by increasing the first transmission rate of the wireless access point to a second transmission rate, wherein reducing the first transmission range includes changing a transmission rate of the access point to change an effective transmission range of the access point according to a distance of the furthest wireless station that is communicating with the access point, and wherein changing the transmission rate changes the transmissions rate to an optimal transmission rate for communicating with the plurality of wireless stations based, at least in part, on the polling.

9. The method of claim 8, wherein determining whether the wireless station is within the predetermined distance includes determining a signal strength for the wireless station and identifying whether the signal strength of the wireless station is the weakest signal strength from a set of wireless stations that are communicating with the wireless access point.

10. The method of claim 8, further comprising:
    selecting a highest common transmission rate from the transmission rates of the set of wireless stations as the optimal transmission rate.

11. The method of claim 10, wherein increasing the first transmission rate of the wireless access point to the second transmission rate is based, at least in part, on the predetermined distance and the optimal transmission rate.

12. The method of claim 8, wherein reducing the first transmission range includes dynamically reducing a transmission power of the wireless access point as a distance for the wireless station decreases.

13. The method of claim 12, wherein reducing the transmission power causes a reduction in the first transmission range.

14. The method of claim 8, further comprising:
monitoring for a foreign station that is not a member of a set of stations communicating with the wireless access point, and adjusting the second transmission rate in response to detecting the foreign station.

15. A non-transitory computer storage medium storing computer executable instructions that when executed by a processor cause the processor to perform a method of operating a wireless access point, wherein the wireless access point is configured to transmit signals at a first transmission rate within a first transmission range, the method comprising:
determining whether a wireless station that is wirelessly communicating with the wireless access point is within a predetermined distance to the wireless access point, wherein the wireless access point is configured to transmit signals at a first transmission rate within a first transmission range, wherein determining whether the wireless station is within the predetermined distance includes determining a distance from the access point to each of a plurality of wireless stations that include the wireless station communicating with the access point, and wherein the wireless station is a furthest wireless station of the plurality of wireless stations from the access point;
determining an optimal transmission rate for the wireless station by polling a set of wireless stations that are communicating with the wireless access point for transmission rates; and
in response to the wireless station being within the predetermined distance to the wireless access point, reducing the first transmission range of the wireless access point to a second transmission range by increasing the first transmission rate of the wireless access point to a second transmission rate, wherein reducing the first transmission range includes changing a transmission rate of the access point to change an effective transmission range of the access point according to a distance of the furthest wireless station that is communicating with the access point, and wherein changing the transmission rate changes the transmissions rate to an optimal transmission rate for communicating with the plurality of wireless stations based, at least in part, on the polling.

16. The non-transitory computer storage medium of claim 15, wherein reducing the first transmission range includes selecting a reduced transmission range from a set of predetermined transmission ranges and adjusting the first transmission range of the device to the reduced transmission range.

17. The non-transitory computer storage medium of claim 15, wherein increasing the first transmission rate includes increasing the first transmission rate upon determining an optimal transmission rate of the wireless station.

18. The non-transitory computer storage medium of claim 15, wherein reducing the first transmission range includes adjusting a transmission power of the wireless access point upon determining a proximity of a furthest wireless station in a set of stations communicating with the wireless access point is within the predetermined distance by reducing the transmission power to cause the device to transmit signals at a reduced transmission range to facilitate avoiding interference with foreign wireless stations.

19. The non-transitory computer storage medium of claim 18, wherein determining the proximity of the furthest wireless station includes determining a proximity of one or more wireless stations to the wireless access point by determining a signal strength of wireless signals from the one or more wireless stations.

20. The non-transitory computer storage medium of claim 15, wherein the non-transitory computer-readable medium is implemented in a device, and wherein the device is a smartphone, a mobile device, a wireless network access point, a camera, or a handheld device.

* * * * *